June 30, 1964  J. B. REICHERT  3,138,920
AIRCRAFT PROPULSION UNIT HAVING A ROTATABLE NOSE SECTION
Filed March 6, 1961  2 Sheets-Sheet 1
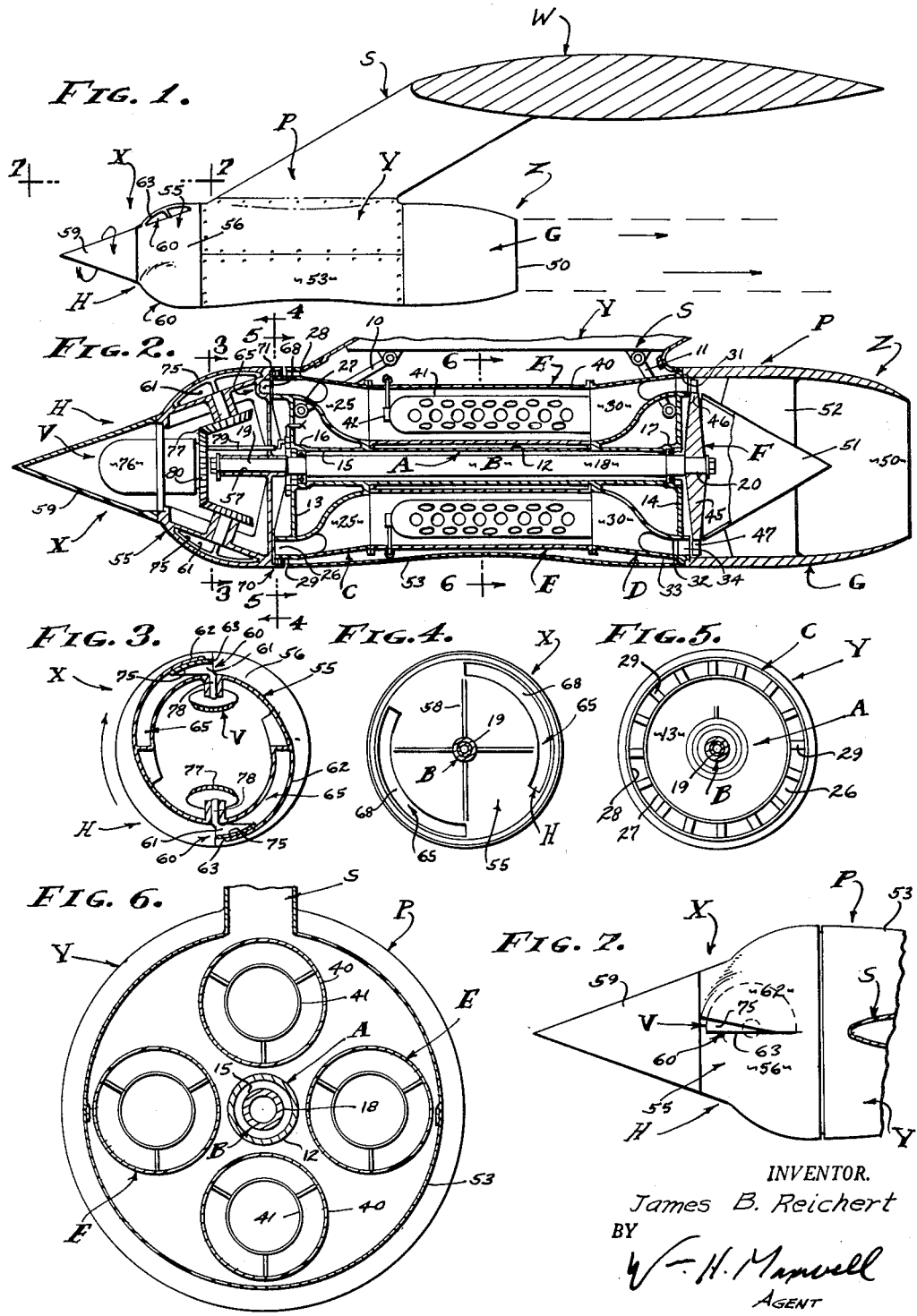
INVENTOR.
James B. Reichert
BY
W. H. Manwell
AGENT June 30, 1964      J. B. REICHERT      3,138,920
AIRCRAFT PROPULSION UNIT HAVING A ROTATABLE NOSE SECTION
Filed March 6, 1961      2 Sheets-Sheet 2
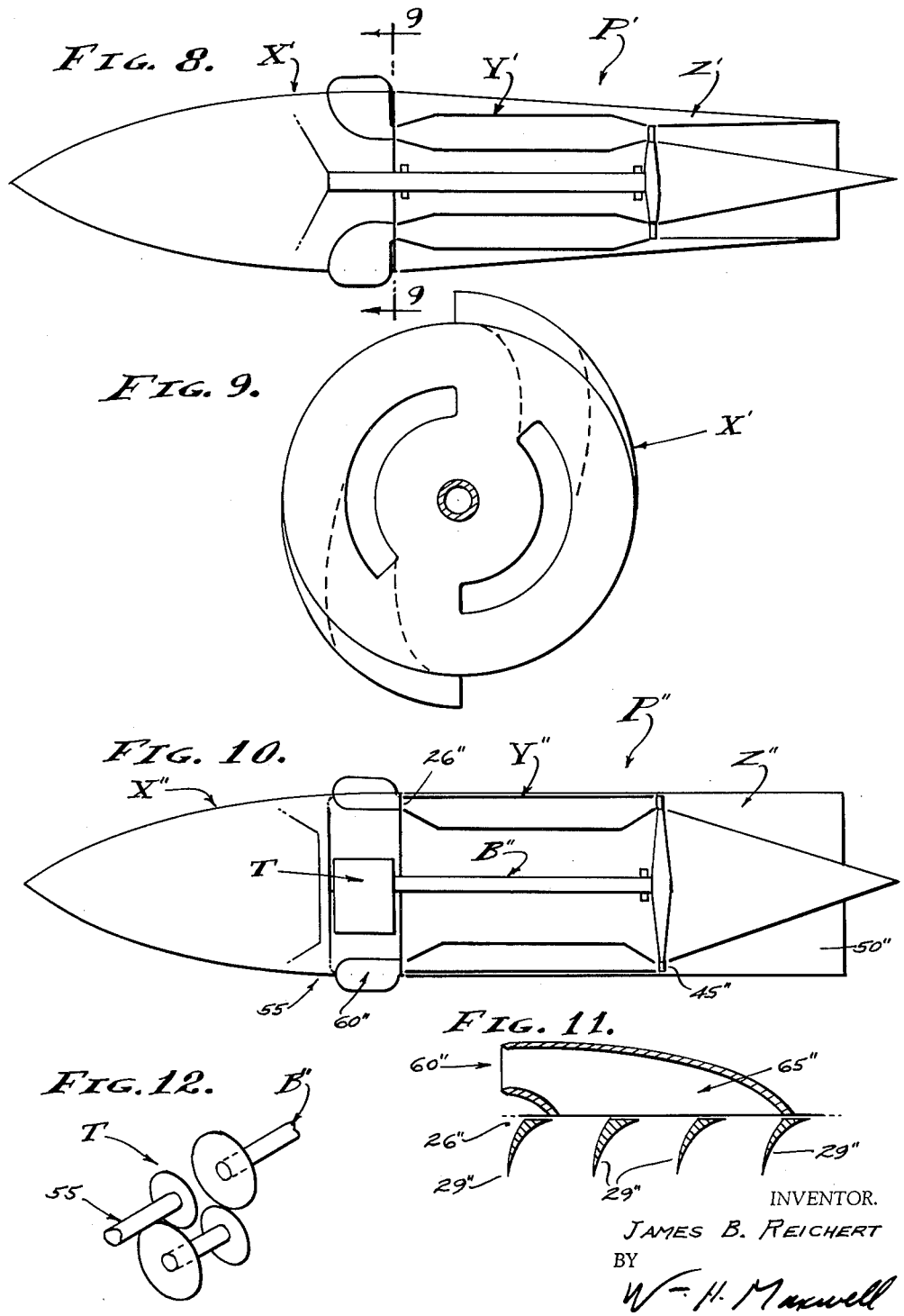
INVENTOR.
JAMES B. REICHERT
BY
W. H. Maxwell
AGENT

3,138,920
AIRCRAFT PROPULSION UNIT HAVING A ROTATABLE NOSE SECTION
James B. Reichert, 10992 Strathmore Drive, Los Angeles, Calif.
Filed Mar. 6, 1961, Ser. No. 93,639
7 Claims. (Cl. 60—35.6)

This invention has to do with a power plant or propulsion unit for aircraft and is more specifically concerned with a turbine type internal combustion thrust producing prime mover involving a unique compressor, it being a general object of this invention to provide an internal combustion turbo jet motor that is of very compact convenient form, which is light in weight, and which involves a minimum number of dependable working parts.

It is a general object of this invention to provide an internal combustion turbine driven propulsion unit that can be used to advantage in aircraft and which involves a compressor that operates at supersonic speeds. The compressor that I provide is particularly useful in connection with turbo jet and turbo prop type aircraft engines.

It is an object of this invention to provide a jet propulsion unit having a compressor of the ram air type and which operates at supersonic speeds even when the aircraft is operating at a lesser speed. The particular ram air type compressor that I provide operates at supersonic speed or speeds regardless of the speed of the aircraft.

It is another object of the present invention to provide a jet propulsion unit of the character referred to wherein a ram air type compressor is directly driven by the turbine wheel of the unit with or without intervening transmissions or drives.

It is still another object of the invention to provide a jet propulsion unit wherein the nose or entry portion of the body thereof is streamlined for operating efficiently at supersonic speeds and which is adapted to receive ram air at the periphery thereof. The invention is characterized by a rotating peripheral part that has ram air scoops preferably at the nose or entry portion of the body. As shown, the entire nose rotates and the scoops receive air laterally of the axis of the structure to the end that the air is compressed. It will be apparent that rotation of said nose at supersonic peripheral speeds will result in efficient compression of air. The single scoop or scoops of this invention replace the complicated and cumbersome compressors that are ordinarily employed, and the resistance of the structure's body to the forward motion of the aircraft is reduced materially by the shape of the particular nose section that I provide.

It is a further object of this invention to provide a power plant involving an internal combustion turbine and involving a ram air type compressor which compressor utilizes peripheral or circumferential motion of certain elements thereof and does not rely upon mere forward motion of the aircraft for ram air.

It is still a further object of this invention to provide a construction which is such that compressed air from a rotating member is communicated to, and circulated into a stationary member without interruption of the flow of said air.

It is still another object of this invention to provide a jet propulsion unit of the character referred to wherein there is provided a variable pitch compressor means which is practical and reliable in operation.

The various objects and features of my invention will be fully understood from the following detailed description of the typical preferred forms and applications of my invention, throughout which description reference is made to the accompanying drawings in which:

FIG. 1 is a view illustrating a typical installation of the propulsion unit that I have provided. FIG. 2 is an enlarged detailed sectional view of the propulsion unit shown in FIG. 1. FIGS. 3, 4, and 5 are transverse sectional views taken substantially as indicated by lines 3—3, 4—4, and 5—5 on FIG. 2. FIG. 6 is an enlarged detailed transverse sectional view taken as indicated by line 6—6 on FIG. 2. FIG. 7 is a view of the nose of the portion of the structure taken as indicated by line 7—7 on FIG. 1. FIG. 8 is a diagrammatic view similar to FIG. 1 and showing a second form of the invention. FIG. 9 is a sectional view taken as indicated by line 9—9 on FIG. 8. FIG. 10 is a diagrammatic view of a third form of the invention. FIG. 11 is a sectional view taken as indicated by line 11—11 on FIG. 10, and FIG. 12 shows the gear box utilized in the said third form of the invention.

The aircraft propulsion unit P that I have provided, considered broadly, may be installed in aircraft in various manner as circumstances require and involves, generally, a compressor section X, a combustion section Y and a turbine section Z. The particular installation illustrated in FIG. 1 of the drawings is a wing installation wherein the propulsion unit P is mounted to occur at exterior of a wing W. The propulsion unit P is shown carried at the terminal end of a depending strut-like element S that projects downwardly and forwardly from the leading edge of the wing W. Suitable mounting brackets 10 and 11 secure the lower end of the strut S to the frame of the unit P as later described. In FIG. 1 of the drawings, I have illustrated a typical wing installation involving the propulsion unit of the present invention, and it is to be observed that the nose or compressor section X of said unit is positioned well forward of the strut S and leading edge of the wing W.

The compressor section X, combustion section Y and turbine section Z are cooperatively related to form a unit P that is elongate and generally round in cross sectional configuration. The compressor section X involves the forward or nose portion of the structure while the turbine section Z involves the rear or tail portion thereof. The combustion section Y is intermediate the portions X and Z, and involves the center portion of the structure. As best illustrated in FIG. 2 of the drawings, the propulsion unit P of the present invention involves, generally, a frame A, a drive shaft B, an air inlet manifold C, an air exhaust manifold D, one or more combustion tubes E, a turbine drive F, a nozzle G, and a compressor H. The various parts and elements referred to are cooperatively related to each other as hereinafter described.

The frame A is provided to carry and cooperatively relate the sections X, Y and Z of the propulsion unit P and is an elongate horizontally disposed element that extends through the structure centrally thereof. In the preferred form of the invention, the frame A involves, generally, an elongate tubular body 12 and spaced mounting flanges 13 and 14. The body 12 extends longitudinally of the frame A along the central axis thereof, the flange 13 being carried at the forward end of the body 12, and the flange 14 being carried at the rear end of the body 12.

The flanges 13 and 14 project radially from the ends of the body 12 and are adapted to support and carry the other elements of the structure that are involved. The tubular body 12 has a passage 15 that extends therethrough and which opens at the ends of the frame A.

The drive shaft B is provided to carry and to operatively connect the moving parts of the structure, and primarily connects the compressor H with the turbine drive F. As shown, the shaft B is a straight elongate element preferably tubular in cross section and extends through the passage 15 in the frame A to project from the forward and rear ends thereof. Spaced anti-friction bearings 16 and 17 are provided and are supported in the end portions of the frame A to rotatably carry the shaft B. The shaft B has a straight elongate center portion 18 and opposite end portions 19 and 20 that projects from the ends of the frame A to support the compressor H and the turbine drive F. It will be apparent that the drive shaft B is freely rotatable in the frame A and that it forms a drive connection between the compressor H and the turbine drive F.

The air handling manifolds C and D are supported by flanges 13 and 14 respectively and surround the forward and rear end portions of the frame A, and are provided to properly diffuse and direct the ram air and the combusted exhaust gases that flow through the unit P when it is operating. The air inlet manifold C is provided to receive compressed air from the compressor H, later described, and to diffuse or divide and direct the said air to the one or more combustion tubes E. In the case illustrated, there is a plurality of tubes E, for example, four tubes, in which case the manifold C is provided with four separate branches 25. The manifold C is characterized by a continuous annular inlet opening 26 at the periphery thereof that is adapted to receive air from the compressor H. The opening 26 is axially disposed having inner and outer walls 27 and 28 that terminate at their forward ends in a radial plane normal to the central axis of the structure. Suitable pitched vanes 29 are provided to extend radially between the walls 27 and 28 at the forward end portion of the manifold C in order to straighten and direct the flow of air as circumstances require. As clearly indicated, the walls 27 and 28 blend into the walls of the branches 25, each of the branches 25 being a round tubular duct-like part adapted to conduct the flow of air. As shown, the rear ends of the branches 25 terminate in a plane normal to the axis of the structure.

The air exhaust manifold D is provided to receive the combusted or burning gases from the combustion tubes E, later described, and to combine or bring together said gases from the one or more combustion tubes E. As pointed out above, there is a plurality of tubes E, for example, four tubes, in which case the manifold D is provided with four separate branches 30. The manifold D is characterized by a continuous annular opening 31 at the periphery thereof that is adapted to discharge gases into the tail cone or nozzle section of the structure. The opening 31 is axially disposed having inner and outer walls 32 and 33 that terminate at their rearward ends in a radial plane normal to the central axis of the structure. Suitable pitched vanes 34 are provided to extend radially between the walls 32 and 33 at the rearward end portion of the manifold D to form jet-like openings in order to direct the exhaust gases into the proper axial direction as circumstances require. As clearly indicated, the walls 32 and 33 blend into the walls of the branches 30, each of the branches being a round tubular duct-like part adapted to conduct the flow of gases. As shown, the forward ends of the branches 30 terminate in a plane normal to the axis of the structure.

There is a plurality of combustion tubes E (see FIG. 6) and each is adapted to extend between the branches 25 and 30 of the tubular manifolds and is suitably connected to the manifolds as by the flanged joints. The combustion tubes E are provided to handle and control the combustion of fuel and involve generally a tubular outer wall 40, a flame holder 41 and a fuel injecting means 42. The wall 40 is preferably round in cross section and extends between the branches 25 and 30 of the two manifolds and is shown connected to the manifolds as by flanged joints. The flame holder 41 may be of any suitable construction, for example, it may be a round tubular element carried concentrically within the wall 40. As shown, the forward end of the holder 41 is closed and the rear end thereof is open to discharge burning gases. The fuel injecting means 42 may be of any suitable form or construction and is shown as involving an injector at each combustion tube adapted to supply fuel into the flame holders 41. It will be apparent how compressed air is delivered from the manifold C to the combustion tubes E and how the fuel is combusted and delivered to the manifold D and from the opening 31. It will be understood that suitable accessory devices may be provided such as for example fuel igniting means, etc.

The turbine drive F is provided to absorb sufficient power from the gases delivered through the structure thus far described to operate the compressor H that I provide. The turbine drive F involves a turbine wheel 45 that is carried on the rear end portion 20 of the shaft B. The wheel 45 is disc-shaped and has a peripheral rim 46 that occurs adjacent the inner wall 32 above described to form a separate continuation thereof. A circumferential series of blades 47 project radially from rim 46 and are suitably pitched to act and react to movement of gases directed by the vanes 34. It will be apparent that the drive F is effective to operate and rotate the shaft B.

The nozzle G is provided to receive and direct the exhaust of gases from the manifold D and it houses the turbine drive F to control the expansion of said gases. As illustrated, the nozzle G is suitably convergent as it extends rearwardly and presents a rearwardly opening orifice 50. The nozzle G is carried by and projects rearwardly from the manifold D and is in effect a continuation of the wall 33. A tail cone 51 is provided adjacent the rearward side of the wheel 45 to control the convergence of the exhaust gases and is supported from the nozzle G by suitable vanes 52 that also straighten the flow of gases.

The first form of the invention thus far described, is operative when provided with an air compressor that delivers compressed air to the air inlet manifold C. In accordance with the invention, the structure thus far described is mounted on a suitable foundation, for example, the strut S above referred to. As shown in FIG. 2 of the drawings, the brackets 10 and 11 extend between the strut S and the front and rear frame flanges 13 and 14 respectively, and secure the propulsion unit P in operative working position. Further, it is to be observed that the structure is of minimum cross sectional configuration commensurate with the working diameters of the operating elements, for example, the diameter of the turbine wheel 45. In accordance with the invention, the exterior of the nozzle G forms the outer wall of the turbine section Z of the unit P, and the combustion section Y of the structure is reduced in cross section. In the preferred form of the invention, the branches 25 and 30 are angularly related to central axis of the structure to extend inwardly whereby the combustion tubes E are positioned to occur diametrically inward of the inlet and exhaust ends of the manifolds C and D respectively. With this relationship of elements, the combustion section Y is of reduced cross sectional configuration, and as shown, is covered or enclosed in a cowling 53 of reduced cross section at the middle portion thereof. The cowling 53 is a faired element that may be aerodynamically-shaped to present but a minimum of drag for optimum results in aircraft operation.

The compressor H that I provide is a ram air type compressor that operates at high rates of speed, preferably at supersonic rates of speed. The compressor H is characterized by but a few simple parts or elements and is driven by the turbine drive F through the shaft B. As shown, the compressor involves, primarily, a single drum-shaped element rotatably supported by the forwardly extending end portion 19 of the shaft B to be driven thereby when the shaft is rotated. As clearly shown in FIGS. 2, 3 and 4 of the drawings, the compressor H involves, generally, a hub 55, one or more air scoops 60 and an air delivery duct 65 for each scoop 60.

The hub 55 may vary widely as circumstances require and is preferably a wheel like element carried adjacent the forward end of the manifold C. In the case illustrated, the hub 55 has a cone-shaped peripheral wall 56 and is tapered forwardly from the peripheral portion of the manifold C to the foremost tip of the structure. The center of the hub 55 is provided with a bore 57 engaged with the shaft part 19, and suitable stiffeners 58 extend radially to make the hub rigid. It is preferred to provide a separate nose cone 59 that is attached to and projects forwardly from the hub 55 forming a continuation of the wall 56.

The particular compressor H, shown in the drawings, has a pair of diametrically opposite air scoops 60 that are provided to receive air from the atmosphere surrounding the hub 55. The scoops 60 are alike and are characterized by a peripheral opening 61 that is adapted to scoop air into the hub when it is rotated. The opening 61 is adjustably positioned as later described, and normally extends longitudinally of the structure, as shown, and opens in a radial plane. The peripheral wall 56 of the hub 55 forms the inner wall of the scoop while the outer wall 62 of the scoop is spaced outwardly from the wall 56 and has a leading edge 63, preferably a straight leading edge. The outer wall 62 is also faired into said peripheral wall 56 substantially, as shown, and the scoop 60 is preferably of substantial longitudinal extent and is of limited radial or vertical extent, as shown. The outer wall 62 also fairs from wall 56 to the outer diameter of the structure at the forward end of manifold C.

The air delivery duct 65 that is provided for each scoop 60 is an air turning duct that conducts air inwardly from the scoop 60 and then axially toward the manifold C. In the case illustrated, the air inlet opening 26 of manifold C is of less mean diameter than the outer periphery of the drum 55 and for this reason, the duct 65 is involutely curved inwardly to the diameter of the opening 26. The duct 65 is also curved or turned rearwardly to extend axially of the structure and to discharge at the rear of the hub 55 and into the opening 26.

In FIGS. 1, 2 and 7 of the drawings, I have illustrated the circumferentially disposed air scoop 60 that is defined by the leading edge 63 that is spaced from the peripheral wall 56 above referred to. In FIG. 3 of the drawings, I have illustrated the scoop 60 as it is associated with the air delivery duct 65 which is defined by spaced involute walls. In FIG. 4 of the drawings, I have illustrated the back or rear end part of the air compressor H where the delivery ducts 65 open at 68 to be in communication with the annular opening 26 in the inlet manifold C. It is to be observed that the openings 68 are arcuately formed concentric with the axis of the structure to continuously communicate with the annular opening 26 at the forward end of the manifold C. In FIG. 5 of the drawings, I have illustrated said continuous annular opening 26 at the forward end of the manifold D as above described, and the annular series of blades 29.

A sealing means 70 is provided between the hub 55 of the compressor H and the manifold C. In accordance with the invention, the hub 55 rotates at high rates of speed, and it is necessary to prevent leakage of compressed air from between the two said elements. As indicated in FIG. 2 of the drawings, I prefer to employ a labyrinth type sealing means 70 that involves a multiplicity of fins 71 or the like that project from one element and into close proximity to a smooth turned part 72 on the other element.

In accordance with the invention, the scoops 60 of the compressor H are adjustably pitched so as to advantageously operate at the different forward speeds of the aircraft. For this purpose, I have employed a variable pitch control means V as illustrated in FIGS. 2, 3 and 7, and which involves, generally, a shiftable lip 75 at each scoop 60, a servo motor 76 for controllably shifting the lips 75 and a drive 77 from the motor 76 to the lips 75. The shiftable lips 75 form a forward extension of the outer wall 62 of the scoops 60 and present said leading edges 63 thereof. The lips 75 are preferably rotatably carried on the hub 55 by means of spindles 78 that extend from the lips diametrically inwardly to the interior of the hub. As shown, the hub is cone-shaped in which case the lips are angularly related to the central axis of the structure. Therefore, the spindles extend inwardly at an angle to said central axis.

The servo motor 76 may be of the type commonly employed to control the pitch of aircraft propellers and may be provided with an electric motor adapted to rotate a gear 80 and supplied by power through electrical lines 79 and slip rings. The drive 77 between the lips 75 and the motor 76 is shown as a gear drive and involves gears on the spindles 78 that mesh with the gear 80 of the servo motor 76. The gears are miter gears to the end that operation of the servo motor 76 rotates the spindles 78 to pitch the scoops 60 as circumstances require. It will be apparent that the servo motor 76 can be remotely controlled to gain the most efficient operation from the scoops 60.

In FIGS. 8 and 9 I have diagrammatically illustrated a second embodiment of the present invention wherein the propulsion unit P' has a compressor section X' of larger diameter than the turbine section Z', there being a combustion section Y' intermediate the sections X' and Z'. The form of invention now under consideration is such as to utilize the phenomenon of shock compression of the intake air at the compressor section X', for example, at a value of approximately Mach 2.0, while the turbine section Z' operates at a substantially lesser value of approximately Mach .8. The said values are for illustration only and in the second form of invention now under consideration are established by differential diameters of the compression section X' and turbine section Z'. This form of invention is essentially the same in all respects to the first form thereof as hereinabove described, the only difference being in the size, relationship, and resultant difference in peripheral speed of the compression section X' and turbine section Z', respectively. In practice, and in order to gain Mach 2.0 of the compressor and Mach .8 of the turbine a diameter differential of about or slightly more than two to one is employed, in which case the rearmost section Z' has a reduced external configuration compared with the foremost section X'. Thus, the propulsion unit P' is somewhat tear-drop-shaped, being of a streamlined supersonic configuration.

In FIGS. 10, 11 and 12 I have diagrammatically illustrated a third embodiment of the present invention wherein the propulsion unit P'' has a compressor section X'', a combustion section Y'' and a turbine section Z'', all of which are or can be of the same diameter. The form of invention now under consideration is also such that it utilizes the phenomenon of shock compression of the intake air at the compressor seciton X'', for example, at a value of approximately Mach 2.0, while the turbine section Z'' operates at a substantially lesser value of approximately Mach .8. The said values in the third form of the invention, now under consideration, are established by revolving the said compressor section X'' and turbine section Z'' at differential speeds, the diameter thereof remaining about or exactly the same. This form of invention differs from the first two forms above described in that a speed changing transmission T is provided intermediate the driving turbine section Z″ and the driven compressor section X″. Because a peripheral speed differential of about or slightly more than two to one (Mach 2.0 to Mach .8) is desired, for example, the transmission T is so constructed and reduced the speed of rotation of the shaft B″ to about or slightly less than one-half the speed of rotation of the compressor section hub 55″. Thus, the propulsion unit P″ is, or can be, of maximum diameter at the rearwardly opening orifice 50″, utilizing a large diameter turbine wheel 45″. Further, and as shown in FIG. 11, the involutely curved and rearwardly turned delivery duct 65″ of the air scoop 60″ discharges into the air inlet opening 26″ of the combustion section Y‴, where vanes 29″ are provided. In this form of the invention, where the compressor section X″ is revolving at one more than twice the speed of the turbine section, it is preferred to use supersonic blading in connection with the design of the said vanes 29″. Therefore, and as illustrated in FIG. 11, the vanes 29″ are of supersonic configuration and adapted to receive compressed air at or about Mach 2.0 and to turn said air to flow axially, or substantially so, accompanied by further compression as the said air enters the inlet opening 26″ of the combustion section Y‴. As shown, the vanes are fixed in a circumferential series, occupying opening 26″ and they are radially disposed vanes. Each vane has a sharpened edge to receive the air discharged by the compressor section and it has a reacting and deflecting face that curves rearwardly to discharge the air axially. It is to be understood that the vanes 29″ can be developed and formed as circumstances require.

From the foregoing, it will be seen that the propulsion unit of the present invention involves a compressor that involves a few simple but easily made parts, and which is adapted to operate at high efficient rates of speed regardless of the forward motion of the aircraft. That is, the compressor section can operate at a Mach 2.0 value, or any other desired value, regardless of aircraft speed. Thus, it is possible to obtain the maximum power at subsonic forward speeds of the aircraft by utilizing the high or supersonic peripheral speed of the rotating nose section of the propulsion unit.

Having described only the typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A prime mover for axial movement through the atmosphere and including, a front compressor section, a rear turbine section, and an intermediate combustion section, said entire compressor section having an exterior exposed to the atmosphere and being rotatably supported adjacent the front of the combustion section and having a circumferentially disposed peripheral air scoop at said exterior and with its opening substantially parallel with the longitudinal axis of movement and adapted to receive ram air when the compressor section is rotated, whereby high compression ratios are obtained without axial movement through said atmosphere.

2. A prime mover having an elongate body for axial movement through the atmosphere and including, a front cone-shaped compressor section, a rear turbine section, and an intermediate combustion section, said entire compressor section having an exterior exposed to the atmosphere and being rotatably supported adjacent the front of the combustion section and having a circumferentially disposed peripheral air scoop at said exterior and with its opening substantially parallel with the longitudinal axis of movement and adapted to receive ram air when the compressor section is rotated, whereby high compression ratios are obtained without axial movement through said atmosphere.

3. A prime mover having an elongate body for axial movement through the atmosphere and including, a front cone-shaped compressor section having an exterior exposed to the atmosphere, a rear turbine section, an intermediate combustion section having an annular opening at its front end, and a rotatable shaft extending longitudinally of the body and carrying said entire compressor section and driven by a turbine wheel in said turbine section, said compressor section having a circumferentially disposed peripheral air scoop at said exterior with its opening substantially parallel with the longitudinal axis of movement and a passage in communication with said annular opening and adapted to receive ram air when the compressor section is rotated, whereby high compression ratios are obtained without axial movement through said atmosphere.

4. A prime mover of the character described and having an elongate body for axial movement through the atmosphere and including, a frame extending longitudinally thereof, a shaft rotatably carried by and extending from the ends of the frame, a combustion section surrounding the frame and having an air inlet manifold at the front end thereof and an exhaust manifold at the rear end thereof, a turbine drive adjacent the exhaust manifold and having a wheel carried by said shaft, and a rotatable compressor adjacent the air inlet manifold and including, a hub carried and driven by said shaft and having a peripheral exterior exposed to the atmosphere, and a circumferentially disposed peripheral air scoop at said exterior and with its opening substantially parallel with the longitudinal axis of movement and adapted to receive ram air when the compressor is rotated, whereby high compression ratios are obtained without axial movement through said atmosphere.

5. A prime mover having an elongate body for high speed axial movement through the atmosphere and including, a front cone-shaped compressor section with an exterior exposed to the atmosphere, a rear turbine section, an intermediate combustion section, a rotatable shaft extending longitudinally of the body and carrying said entire compressor section and driven by a turbine wheel in said turbine section, said compressor section having a circumferentially disposed and shiftable air scoop at the said exterior and with its opening substantially parallel with the longitudinal axis of movement and adapted to receive ram air when the compressor section is rotated, and a variable control means for shifting said air scoop, whereby high compression ratios are obtained without axial movement through said atmosphere.

6. A prime mover for axial movement through the atmosphere and including, a front compressor section, a rear turbine section, and an intermediate combustion section, said entire compressor section having an exterior exposed to the atmosphere and being rotatably supported adjacent the front of the combustion section and having a circumferentially disposed peripheral air scoop at said exterior and with its opening substantially parallel with the longitudinal axis of movement and of larger diameter than the rear turbine section and adapted to receive ram air when the compressor section is rotated, whereby high compression ratios are obtained without axial movement through said atmosphere.

7. A prime mover having an elongate body for axial movement through the atmosphere and including, a front cone-shaped compressor section having an exterior exposed to the atmosphere, a rear turbine section, an intermediate combustion section, and a rotatable shaft extending longitudinally of the body and carrying said entire compressor section and driving said compressor section and said shaft being driven by a turbine wheel in excess of the speed of said turbine wheel, said compressor section having a circumferentially disposed peripheral air scoop at said exterior and with its opening substantially parallel with the longitudinal axis of movement and adapted to receive ram air when the compressor section is rotated, whereby high compression ratios are obtained without axial movement through said atmosphere.

References Cited in the file of this patent

UNITED STATES PATENTS

| | | |
|---|---|---|
| 1,359,048 | Fridell | Nov. 16, 1920 |
| 1,753,112 | Engledow | Apr. 1, 1930 |
| 2,413,372 | Paulson | Dec. 31, 1946 |
| 2,434,745 | Paulson | Jan. 20, 1948 |
| 2,702,985 | Howell | Mar. 1, 1955 |
| 2,850,226 | Lundquist | Sept. 2, 1958 |
| 2,876,621 | Bogert et al. | Mar. 10, 1959 |
| 2,877,965 | Wakefield | Mar. 17, 1959 |
| 2,959,916 | Carlton | Nov. 15, 1960 |

FOREIGN PATENTS

| | | |
|---|---|---|
| 802,740 | Germany | Feb. 22, 1951 |